United States Patent [19]

Vurpillat

[11] Patent Number: 4,760,277
[45] Date of Patent: Jul. 26, 1988

[54] COMPUTER BACKUP POWER SUPPLY WITH KEYBOARD LIGHTING

[75] Inventor: Victor V. Vurpillat, Laguna Niguel, Calif.

[73] Assignee: Unison Technologies, Inc., Mission Viejo, Calif.

[21] Appl. No.: 14,633

[22] Filed: Feb. 13, 1987

[51] Int. Cl.⁴ .............................................. A61G 13/00
[52] U.S. Cl. .......................................... 307/64; 362/33
[58] Field of Search ............................. 307/64; 362/33

[56] References Cited

U.S. PATENT DOCUMENTS 4,349,863  9/1982  Petersen .................................. 307/64
4,414,609  11/1983  Shemitz .................................. 362/33
4,626,965  12/1986  Gupta et al. .......................... 362/33

Primary Examiner—Bernard Roskoski
Attorney, Agent, or Firm—Weissenberger & Peterson

[57] ABSTRACT

A system includes a power supply unit adapted to provide power from a separate backup source of power to a computer in the event of an interruption in a primary source of power, the unit having a size and shape adapted to be set on a support surface in a position above a keyboard utilized to provide input to the computer. An illumination panel, including at least one lamp on the power supply unit, illuminates the keyboard when activated, and a control circuit activates the illumination panel utilizing the backup source of power when there is an interruption in the primary source of power.

10 Claims, 3 Drawing Sheets

COMPUTER BACKUP POWER SUPPLY WITH KEYBOARD LIGHTING

CROSS-REFERENCES TO RELATED APPLICATIONS

This application is related to the copending application Ser. No. 014705, filed 02/15/87 entitled "Uninterrupted Power Supply System" and to the copending application Ser. No. 014626, filed 02/13/87 entitled "Ring Detector."

BACKGROUND OF THE INVENTION

1. Technical Field.

The invention described in this application relates generally to power supplies, and more particularly to a new and improved backup power supply suitable for use with a conventional personal computer.

2. Background Information.

Some backup power supplies are designed to provide power to a computer during an interruption in the primary power source. This is often accomplished by automatically switching over to a battery supply during the interruption, and back to the primary power source once it has again stabilized. When this is properly done, computer operations can continue during the interruption, and data loss is less likely.

However, power interruptions often have additional consequences that affect computer operations. For example, consider a situation where the computer is located in a windowless office or is being operated during hours of darkness. A power interruption in such a situation is usually accompanied by a loss of lighting, and office lighting is frequently not provided with a backup power source. Thus, the loss of lighting prevents normal keyboard operation so that required commands can not be conveniently entered. Operations may halt with loss of time and data even though the computer has a backup power supply.

Consequently, it is desirable to have a new and improved backup power supply designed to overcome this problem also—one that would enable operator control of the keyboard during primary power interruptions causing loss of lighting.

SUMMARY OF THE INVENTION

This invention recognizes the problems associated with the prior art and provides a new and improved computer backup power supply with the desired attributes.

Briefly, the above and further objects of the present invention are realized by providing a backup power supply system featuring automatically activated keyboard illumination.

Generally, the system includes a power supply unit adapted to provide power from a separate backup source of power to a computer in the event of an interruption in a primary source of power. The unit has a size and shape adapted to be set at a computer workstation in a position above a keyboard utilized to provide input to the computer, and it may take the form of a case that can be set atop a conventional personal computer (PC) in this position, in a stacked array of keyboard, keyboard tray, PC, case, and display monitor.

An illumination panel is mounted on the power supply unit in a position adapted to illuminate the keyboard when the illumination panel is activated, and a control circuit couples activates the illumination panel when there is an interruption in the primary source of power utilizing the backup source of power. Thus, operator control of the keyboard can proceed uninterrupted, and required commands can still be entered during the interruption in primary power.

Accordingly, it is an object of the invention to provide a new and improved power supply system with keyboard illumination features. It is an object to provide such a system that automatically illuminates the keyboard when there is an interruption in primary power. In addition, it is an object of the invention to provide a system for doing this efficiently and with little added cost in an attractive unit that can be stacked with other personal computer units.

DESCRIPTION OF THE PREFERRED EMBODIMENTS

Figure 1:
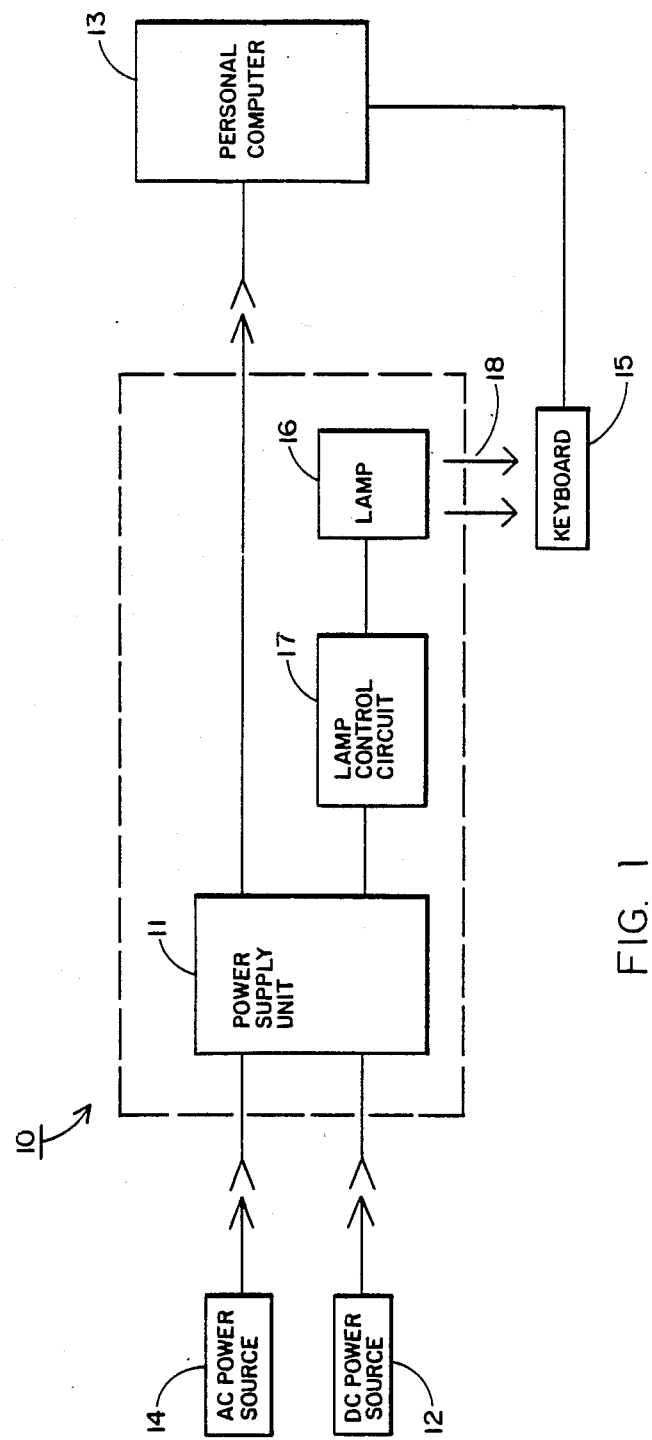
FIG. 1 is a schematic block diagram of a backup power supply system constructed according to the invention.

Referring now to FIG. 1, there is shown a block diagram of a new and improved system 10 constructed according to the invention. It includes three main sections enclosed within dashed lines. First, there is a power supply unit 11 that is adapted to supply power from a separate backup source of power, such as a twenty-four volt DC power source 12, to a computer 13 in the event of an interruption in a primary source of power that is otherwise coupled to the computer 13, such as a one hundred twenty volt, sixty Hertz AC power source 14.

The power supply unit 11 may take any of various configurations, such as that of the system described in the above-identified copending application entitled "Uninterrupted Power Supply System," and that application is incorporated herein by reference for the details provided.

According to this invention, the unit 11 has a size and shape adapted to be set on a support surface in a position above a keyboard 15 utilized to provide input to the computer 13, and it is connected to an illumination panel having at least one lamp 16 for illuminating the keyboard 15. A control circuit 17 utilizes the backup power source, DC power source 12, to power the lamp 16 when there is an interruption in the primary source of power, AC power source 14. Thus, light depicted by the arrows at a reference numeral 18 in FIG. 1 provides sufficient illumination so that operator control of the keyboard 15 can continue despite a loss of other lighting during the interruption.

Figure 2:
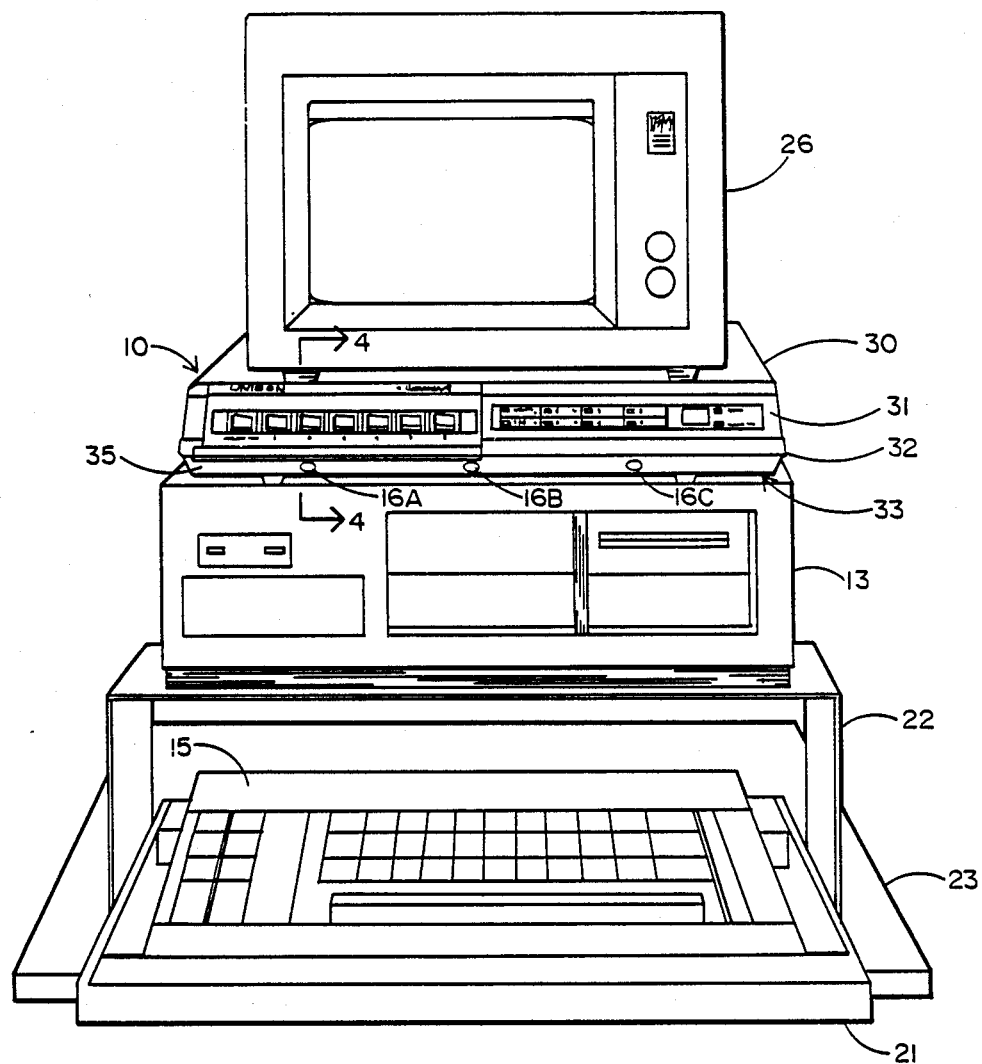
FIG. 2 of the drawings is a perspective view of the backup power supply system shown in position atop a conventional personal computer.
Figures 3, 4:
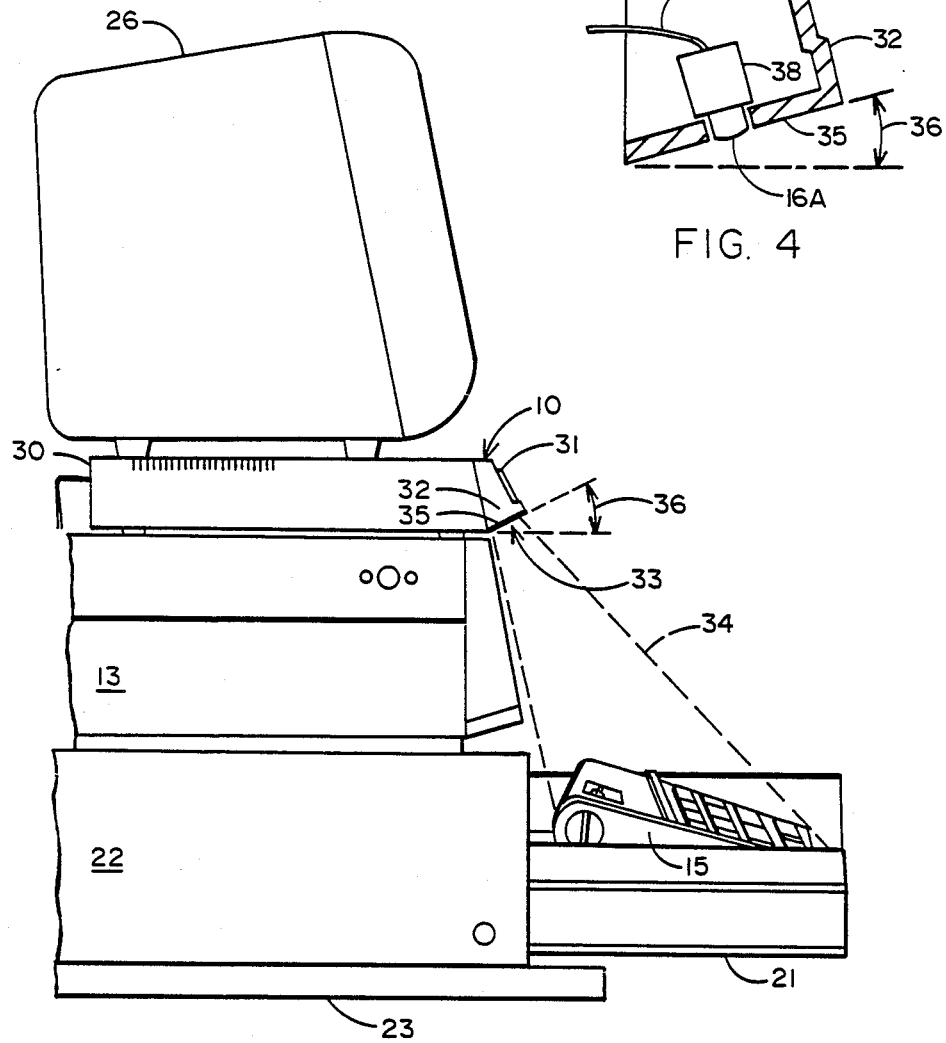
FIG. 3 is side view of the system showing the lamp illuminating the keyboard.
FIG. 4 is an enlarged cross sectional view of the front panel portion of the system 10 taken on line 4—4 of FIG. 2.

Referring now to FIGS. 2 and 3, there is shown a stacked array of computer components that includes a conventional keyboard tray 21. It is attached like a drawer to a keyboard tray support 22, and the keyboard tray support 22 is set on a suitable work surface 13 (such as a desk or work table). The keyboard tray 21 is positioned in an operating position such that with the computer 13 on the keyboard tray support 22, the keyboard 15 is slightly ahead of the computer 13.

The system 10 is, in turn, set in a position atop the computer 13, and a display monitor 26 set is atop the system 10. Stacked in this manner, these components form a workstation, such as might be used for word processing or other purposes, with the system 10 switching the computer to backup power and illuminating the keyboard 15 in the event of a power interruption in a primary power source used to power the computer 13.

Generally, the system 10 includes a cabinet or case 30 in which the power supply unit 11, lamp 16, and control circuit 17 are housed. The case 30 is fabricated according to known techniques from suitable material such as sheet metal to have a size and shape adapted to be set in a position above the keyboard 15. The illustrated case 30 is approximately forty-six centimeters wide, forty-three centimeters deep, and six to seven centimeters high. Thus, it fits well as a member of the stacked array.

Together, the case 30, the power supply unit 11, lamp 16, and control circuit 17, including a DC power source 12 in the form of batteries within the case 30, may weigh on the order of eleven to twelve kilograms. Thus, the system 10 can be conveniently handled and set directly upon a conventional personal computer. Of course, another size case can be used depending on the manner in which the computer components are intended to be arranged, and the weight may vary. In addition, the system 10 can be otherwise supported, such as on a shelf located generally above the keyboard 15.

The case 30 includes a forward portion or front panel 31 on which is mounted a complement of operator controls. The front panel 31 includes a lower portion 32 on which an illumination panel 33 is mounted. The illumination panel 33 may employ any of various shapes and known illumination devices. The illustrated panel 33 includes one or more lamps, such as a group of three twenty-four volt lamps 16A-C (FIG. 2) that are mounted on the lower portion 32 by suitable means (not shown) and operatively connected to the system 10 by a socket 38 and pair of wires 39 (FIG. 4) to cast light downwardly as indicated by the dashed lines at a reference numeral 34 in FIG. 3.

In this regard, the wires 39 are coupled to the control circuit 17 (FIG. 1), and the control circuit 17 uses known circuitry and components to switch power from a backup power source, such as the DC power source 12, to the lamps 16A-C when there is an interruption in the primary source of power. The control circuit 17 may be configured to activate the lamps 16A-C at other times also without departing from certain inventive aspects of the invention. For example, the control circuit 17 may be configured to do this in response to activation of a manual switch. In addition, a light sensor can be employed to override the control circuit to keep the lamps 16A-C off if there is sufficient light present proximate the keyboard 15.

The illumination panel 33 is disposed along the width of the front panel 21. The lower portion 32 of the front panel 31 includes a lower panel 35 that is inclined approximately fifteen degrees as indicated at a reference numeral 26 in FIGS. 3 and 4, and the lamps 16A-C extend through three openings in the panel 35 as illustrated by the lamp 16A in FIG. 4. The panel 35 and the lamps 16A-C combined to form the illumination panel 33.

With the panel 35, and thus the illumination panel 33, inclined in this manner, light emanating from the lamps 16A-C is directed downwardly toward the keyboard 15, and with the system 10 placed approximately twenty to twenty-five centimeters above the keyboard 15, light from the lamps sufficiently illuminates the keyboard 15 to enable continued operation of the keyboard 15. A typical keyboard may present a surface approximately forty-five centimeters by twenty centimeters, and light from the illumination panel 33 adequately covers this surface without shining in the operator's eyes, or being otherwise directed where it is not required.

Of course, the system 10 can be mounted more than twenty centimeters above the keyboard 15, according to the size lamps utilized and the minimum amount of illumination desired by a particular operator. However, the illustrated system 10 achieves adequate illumination of substantially just the keyboard 15 (and immediate area) using a miniature twenty-four volt lamp supported at this height.

Thus, the system 10 provides a novel combination that enables operator control of the keyboard during primary power interruptions causing loss of lighting. Although an exemplary embodiment of the invention has been shown and described, many changes, modifications, and substitutions may be made by one having ordinary skill in the art without necessarily departing from the spirit and scope of this invention.

What is claimed is:

1. A system, comprising:
a power supply unit adapted to provide power to a computer from a separate backup source of power in the event of an interruption in a primary source of power that otherwise provides power to the computer, the unit having a size and shape adapted to be set on a support surface in a position above a keyboard utilized to provide input to the computer;
illumination means, including at least one lamp mounted on the power supply unit, for illuminating the keyboard;
control means for activating the illumination means with power from the backup source of power when there is an interruption in the primary source of power;
a case housing the power supply unit; and
a forward portion of the case adapted to overhang the keyboard when the case is set on the support surface in a position above the keyboard and support the illumination means in a position to illuminate the keyboard.

2. A system as recited in claim 1, wherein:
the illumination means is mounted on a lower portion of the forward portion in a position such that a substantial portion of light emanating from the illumination means is directed downwardly toward the keyboard.

3. A system as recited in claim 2, wherein:
the illumination panel is mounted on the lower portion in a position such that light emanating from the illumination means covers a keyboard-size area at a distance approximately equivalent to the distance from a conventional keyboard tray to the top of a conventional personal computer supported on a conventional keyboard tray support.

4. A system as recited in claim 1, wherein:
the case has a size and shape adapted to be supported by a conventional keyboard tray support.

5. A system as recited in claim 1, wherein:

the case has a size and shape adapted to be supported atop a conventional personal computer.

6. A system as recited in claim 1, wherein:
the case has a size and shape adapted to support a conventional computer display monitor.

7. A system as recited in claim 1, wherein the illumination means includes:
a plurality of lamps.

8. A system as recited in claim 7, wherein:
the lamps are adapted to be powered by a twenty-four volts DC 9. A system as recited in claim 1, wherein:
the control means is adapted to activate the illimination means when there is an interruption in the primary source of power and deactivate the illumination means when the primary source of power is again stabilized.

10. A system, comprising:
a case having a size and shape adapted to house a power supply unit and be supported atop a conventional personal computer that is supported above a keyboard;
a forward portion of the case adapted to overhang the personal computer;
at least one lamp mounted on a lower portion of the forward portion in a position such that a substantial portion of light emanating from the lamp is directed downwardly toward the keyboard when the lamp is turned on;
a power supply unit substantially within the case that is adapted to provide power to the computer from a separate backup source of power in the event of an interruption in a primary source of power that otherwise provides power to; and
control means for turning the lamp on utilizing the backup source of power when there is an interruption in the primary source of power.

* * * * *